United States Patent [19]
Voss et al.

[11] Patent Number: 5,799,483
[45] Date of Patent: Sep. 1, 1998

[54] COMBINE HARVESTER HEADER LATERAL LEVELLING

[76] Inventors: Douglas A. Voss, 64 Scotia Avenue, Brantford, Ontario N3R 6X5, Canada; David G. Link, R. R. #2, Cayuga, Ontario, N0A 1E0, Canada

[21] Appl. No.: 705,345

[22] Filed: Aug. 29, 1996

[51] Int. Cl.⁶ .................................................. A01D 57/00
[52] U.S. Cl. ............................ 56/14.9; 56/15.6; 56/228; 460/119
[58] Field of Search ........................ 56/14.3, 14.9, 56/15.2, 15.1, 15.6, 15.9, 1, 218, 221, 220, 228; 460/119; 403/13, 14, 79, 119

[56] References Cited

U.S. PATENT DOCUMENTS

| | | |
|---|---|---|
| 2,750,728 | 6/1956 | Bailey . |
| 2,796,717 | 6/1957 | Orelind et al. . |
| 2,821,059 | 1/1958 | Heitshu . |
| 2,904,949 | 9/1959 | Bell . |
| 3,008,724 | 11/1961 | Lapins et al. . |
| 3,386,235 | 6/1968 | Van Der Lely . |
| 3,675,404 | 7/1972 | Izakson . |
| 3,975,890 | 8/1976 | Rodger . |
| 3,981,125 | 9/1976 | Kerber et al. . |
| 4,151,700 | 5/1979 | Gardella . |
| 4,211,057 | 7/1980 | Dougherty et al. . |
| 4,249,365 | 2/1981 | Hubbard et al. . |
| 4,253,295 | 3/1981 | Kneper . |
| 4,266,391 | 5/1981 | McDuffie et al. . |
| 4,313,294 | 2/1982 | Martenas . |
| 4,332,126 | 6/1982 | Van Auwelaer et al. . |
| 4,487,004 | 12/1984 | Kejr . |
| 4,527,381 | 7/1985 | Mann . |
| 4,541,229 | 9/1985 | Elijah . |
| 4,612,757 | 9/1986 | Halls et al. . |
| 4,622,803 | 11/1986 | Lech . |
| 4,641,490 | 2/1987 | Wynn et al. . |
| 4,722,173 | 2/1988 | Covington et al. ............ 56/15.6 X |
| 4,733,523 | 3/1988 | Dedeyne et al. . |
| 4,776,153 | 10/1988 | DePauw et al. . |
| 5,155,984 | 10/1992 | Sheehan . |
| 5,341,628 | 8/1994 | Schumacher, II et al. . |
| 5,359,836 | 11/1994 | Zeuner et al. . |
| 5,381,645 | 1/1995 | Schumacher et al. . |
| 5,415,586 | 5/1995 | Hanson et al. . |
| 5,437,145 | 8/1995 | Farley et al. ..................... 56/15.6 |
| 5,463,854 | 11/1995 | Chmielewski, Jr. et al. . |
| 5,522,670 | 6/1996 | Gilmore et al. ................ 56/15.9 X |
| 5,535,578 | 7/1996 | Honey ............................ 56/15.6 X |

OTHER PUBLICATIONS

Case I. H. Field Tracker Parts Book –Nov., 1994.

*Primary Examiner*—Terry Lee Melius
*Attorney, Agent, or Firm*—Reising, Ethington, Learman & McCulloch

[57] ABSTRACT

The combine harvester (10) has a bar (94) with male ends (96) and (98) attached to the elevator housing (20). The male end (96) has an arcuate surface (100) and the male end (98) has an arcuate surface (102). A left female arcuate section (158) and a right female arcuate section (160) are secured to the header frame (64). An arcuate plate (168) of the arcuate section (160) engages the arcuate surface (100) and an arcuate plate 182 of the arcuate section 160 engages the arcuate surface 102. A hook assembly (110) in the lateral center of the elevator inlet (47) and below the floor (24) of the elevator housing engages the round bar (154) and clamps the header (62) to the elevator housing (20). A hydraulic cylinder (196) is connected to the elevator housing (20) and the header (62) and pivots the header relative to the elevator housing about a generally horizontal fore and aft axis adjacent to the hook assembly (110).

7 Claims, 5 Drawing Sheets

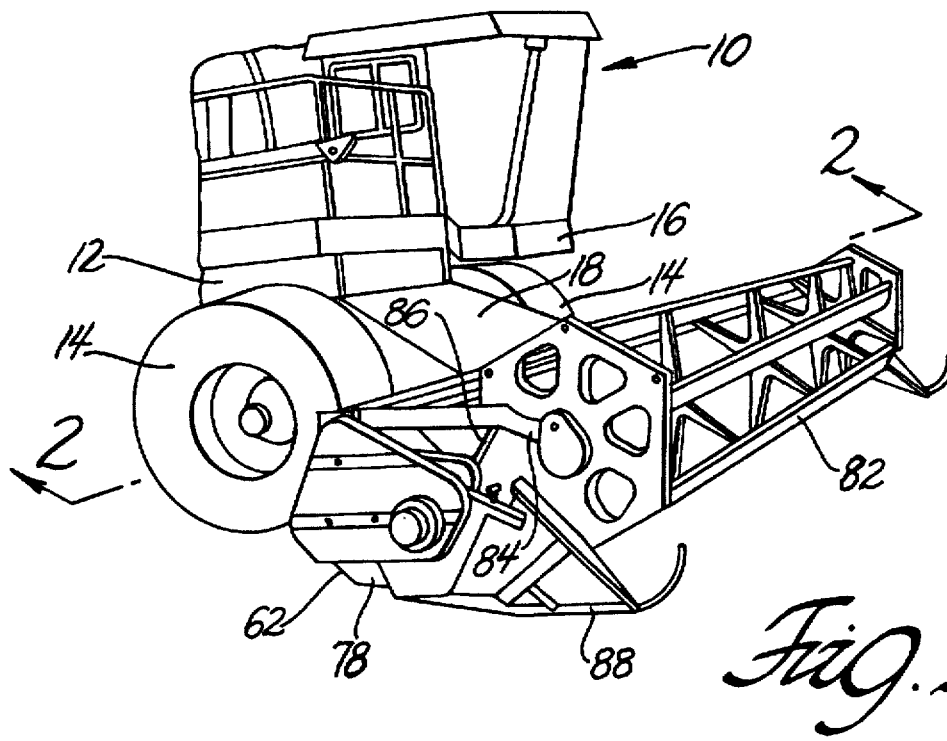
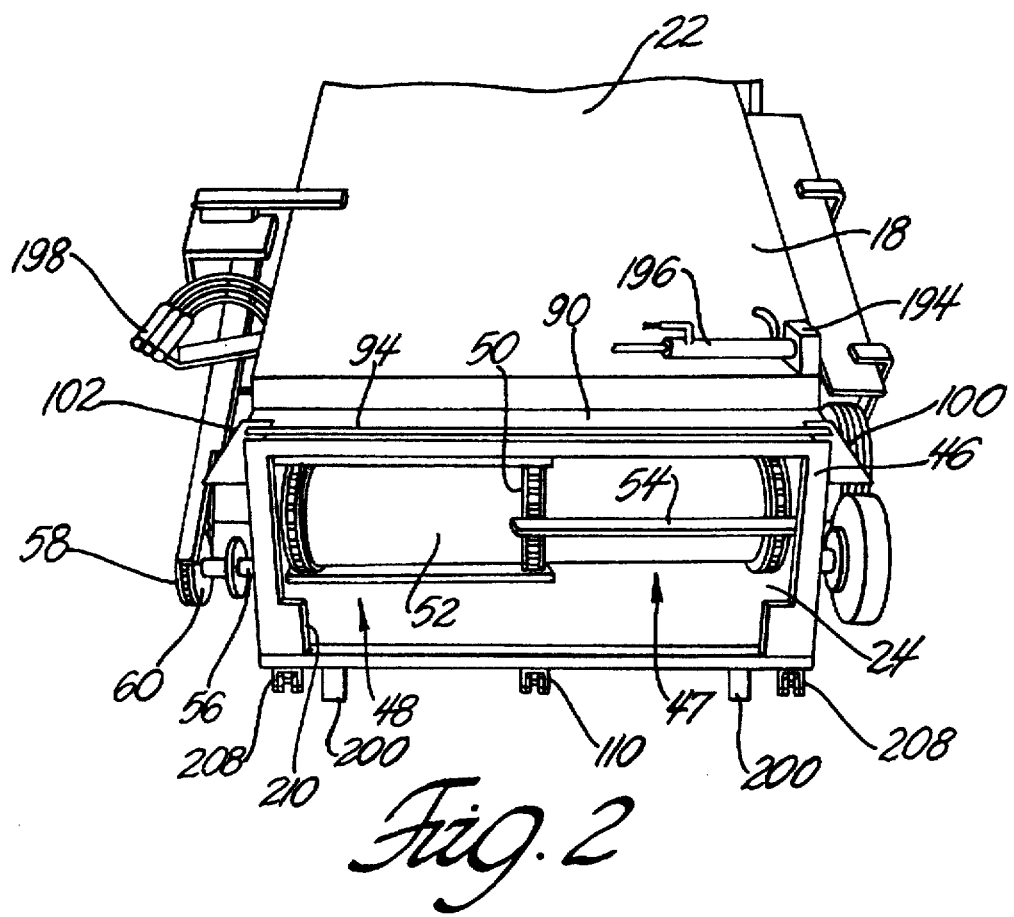

Fig. 3

COMBINE HARVESTER HEADER LATERAL LEVELLING

BACKGROUND OF THE INVENTION

This invention relates to a combine harvester with lateral header leveling and more particularly to an improved pivot connection between a header and a combine elevator assembly that allows lateral leveling.

Early combine harvesters have headers with an inboard end pivotally supported adjacent to the conveyor to the threshing assembly and a wheel supporting the outboard end. As a wheel supporting the outboard end past over surface undulations limited lateral leveling takes place. Self propelled combines, which came into large scale use in the 1940's, had headers that were rigidly attached to the front of an elevator to the thrashing cylinder. Lateral leveling of these rigidly attached headers was limited to leveling the header relative to a flat surface before the harvester was taken to the field.

Grain is grown on hillsides in many areas. To reduce grain loss hillside combine harvesters were developed. Hillside combines have leveling mechanisms that maintain the threshing, separating and cleaning mechanisms in a vertical position by raising and lowering the front drive wheels relative to the combine frame and to each other. This action effectively rotates the combine threshing, separating, and cleaning assemblies about a horizontal fore and aft axis. For this movement to work the header of a hillside combine must pivot relative to the housing for the threshing mechanism about a fore and aft axis. Early self-propelled hillside combines have the header pivotally attached to the elevator to the cylinder or have the elevator to the cylinder pivotally attached to the threshing mechanism housing for pivotal movement about a fore and aft axis. The headers for these machines were attached to the drive wheel supports by a linkage so that the header remains substantially parallel to the drive wheels and to the ground.

Combine harvesters are used to harvest a wide variety of crops today. These crops frequently require special headers. Rigid headers are used for wheats and other small grains. Corn heads are used for harvesting corn. Floating cutter bars or flexible headers are used for soy beans. Row crop headers can be used for crops such as milo and soy beans. To allow a farmer to switch from one header to another header, quick attach headers have been developed. These headers are designed to simplify the connection and disconnection between a header and the forward end of the elevator to the cylinder. The connection allows the combine to move up to a header and position the front end of the elevator to the cylinder in a position to raise the table off the ground. The forward end of the elevator housing is then raised and the header is raised with it. After the header is raised it is clamped to the elevator housing and the drives on the combine are attached to the header.

The capacity of combines has increased substantially since 1950. Today headers that are 30 feet wide or even wider are frequently used. The front drive wheels of the combine are generally about 14 feet wide from outside to outside. A header that harvests a 30 foot wide strip extends laterally out past the wheels more than 8 feet on each side of the combine. This geometry results in one end of the header dropping about 1.5 inches and the other end raising about 1.5 inches when the drive wheel on one side sinks into the soil 1 inch more than the drive wheel on the other side. A 3 inch difference in the height of a header from one end to the other can place one end in the ground and the other end above crop material with valuable grain. To eliminate this problem lateral leveling mechanisms similar to the hillside combine table tilting mechanisms have been developed.

The lateral leveling mechanism, for positioning large headers in positions in which they are generally parallel to the surface of the ground even when one combine drive wheel is in a small depression and the other drive wheel is on a small ridge, have limitations. The majority of these lateral leveling mechanisms are a short sandwich extension to the front of the elevator housing. The rear portion of the sandwich attaches to the front of the elevator housing the same way a header attaches to the elevator. The front of the short sandwich is substantially identical to the front of the elevator housing to facilitate the attachment of a header to the front of the sandwich. The short sandwich moves the header forward from the forward end of the elevator housing a few inches. This forward position of the header may cause a number of problems.

Large headers weigh several thousand pounds. Moving the center of gravity of the header further forward from the front drive wheels may create combine instability. Under some circumstances the rear wheels of combines have come off the ground. The forward movement of the header center of gravity also increases the load on the hydraulic system that raises and lowers the header.

The elevator housing contains a conveyor assembly that conveys crop material from the header to the threshing mechanism. The extra space between the elevator conveyor assembly and the header created by the sandwich can create crop material feeding problems. These crop material feeding problems may limit the capacity of the combine.

SUMMARY OF THE INVENTION

An object of the invention is to provide lateral leveling for a header which minimizes increase in the space between the header conveyor and the conveyor in the elevator housing. Another object of the invention is to provide a mechanism for attaching a header to an elevator housing that also provides lateral leveling. A further object of the invention is to provide a simple lateral leveling attachment that can be mounted on existing combine harvesters.

The lateral leveling assembly includes two pair of mating male and female arcuate sections. One pair of male and female arcuate sections is adjacent to the upper left hand corner of the inlet into the elevator housing when the header is attached. The other pair of male and female arcuate sections is adjacent to the upper right hand corner of the elevator housing when the header is attached. All of these arcuate sections have a radius about a point in the lateral center of the elevator housing and slightly below the floor of the elevator housing at the inlet into the housing. The male and female arcuate sections are movable into and out of engagement with each other to connect and disconnect the header to and from the elevator housing of a combine harvester.

The male arcuate sections are attached to the top of the elevator housing. One of the male arcuate sections is adjacent to the left side wall and the elevator housing inlet. The other male arcuate section is adjacent to the right side wall and the elevator housing inlet. The female arcuate sections are attached to the upper portion of the header frame.

Low friction high density plastic strips are attached to the mating surfaces between the header and the elevator housing. These plastic strips are ⅛ of an inch thick and move the header ⅛ of an inch forward from its normal position.

A clamp clamps the header to the elevator housing near the point where the radius of curvature of each of the two male arcuate sections originates and where the apparent axis of rotation of the header is located. The clamp accommodates pivotal movement of the header relative to the elevator housing and maintains engagement between the male and female arcuate sections.

A hydraulic cylinder has one end attached to the elevator housing and the other end attached to the header frame. Extension of the hydraulic cylinder pivots the header relative to the elevator housing in one direction. Retraction of the hydraulic cylinder pivots the header relative to the elevator housing in another direction. The header has a total range of movement relative to the elevator housing of 8°.

BRIEF DESCRIPTION OF THE DRAWINGS

The foregoing objects and features of the invention will become apparent to those skilled in the art from the following detailed description of a preferred embodiment, especially when taken in conjunction with the accompanying drawings wherein like numerals in the several views refer to corresponding parts.

FIG. 1 is a perspective view, of a combine harvester and a header with lateral leveling, with parts broken away;

FIG. 2 is a perspective view of the front of the elevator housing taken along lines 2—2 in FIG. 1 with parts broken away;

Figure 3:
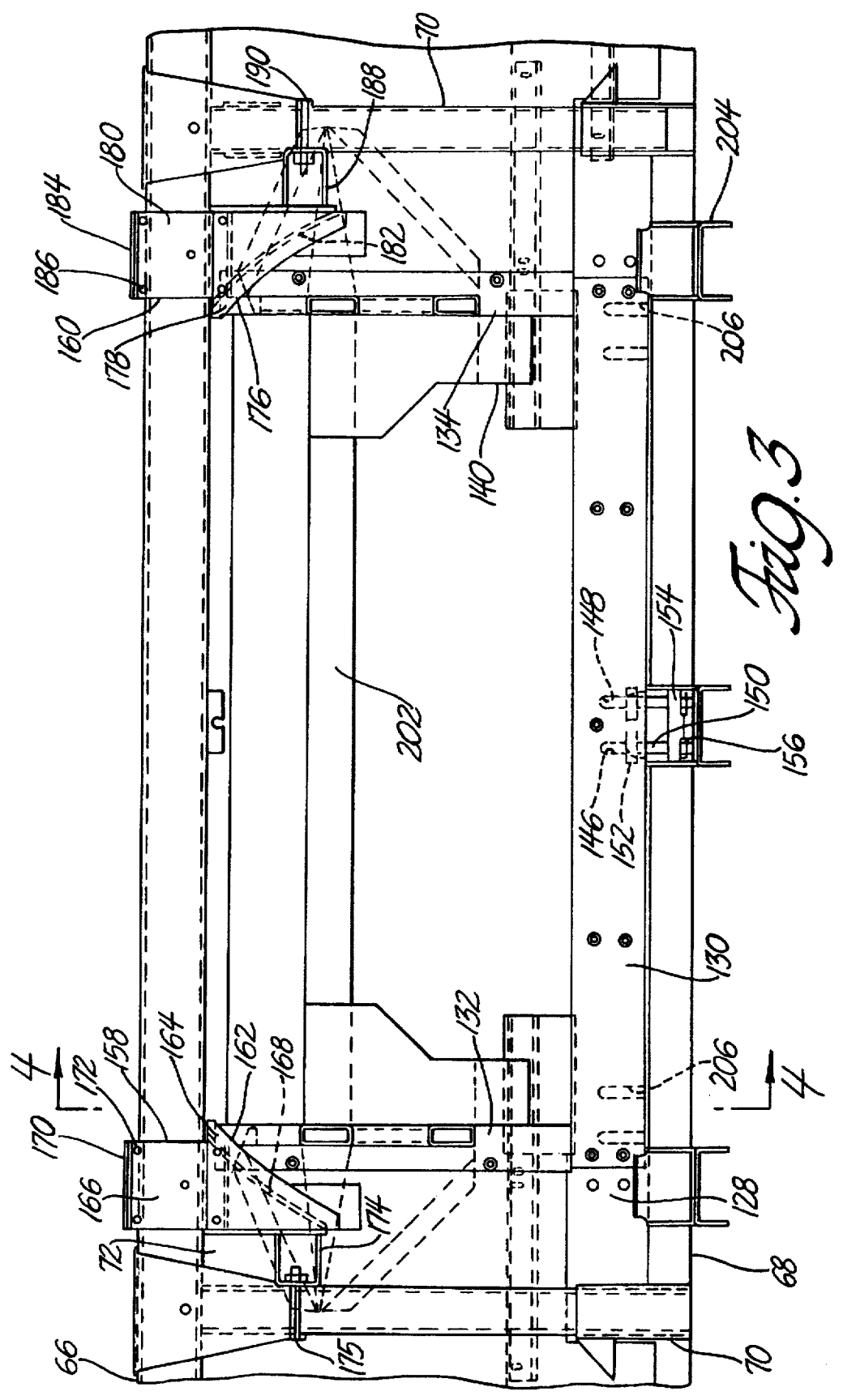

FIG. 3 is an enlarged rear elevational view of the header with parts broken away;

DESCRIPTION OF THE PREFERRED EMBODIMENT

Figure 4:
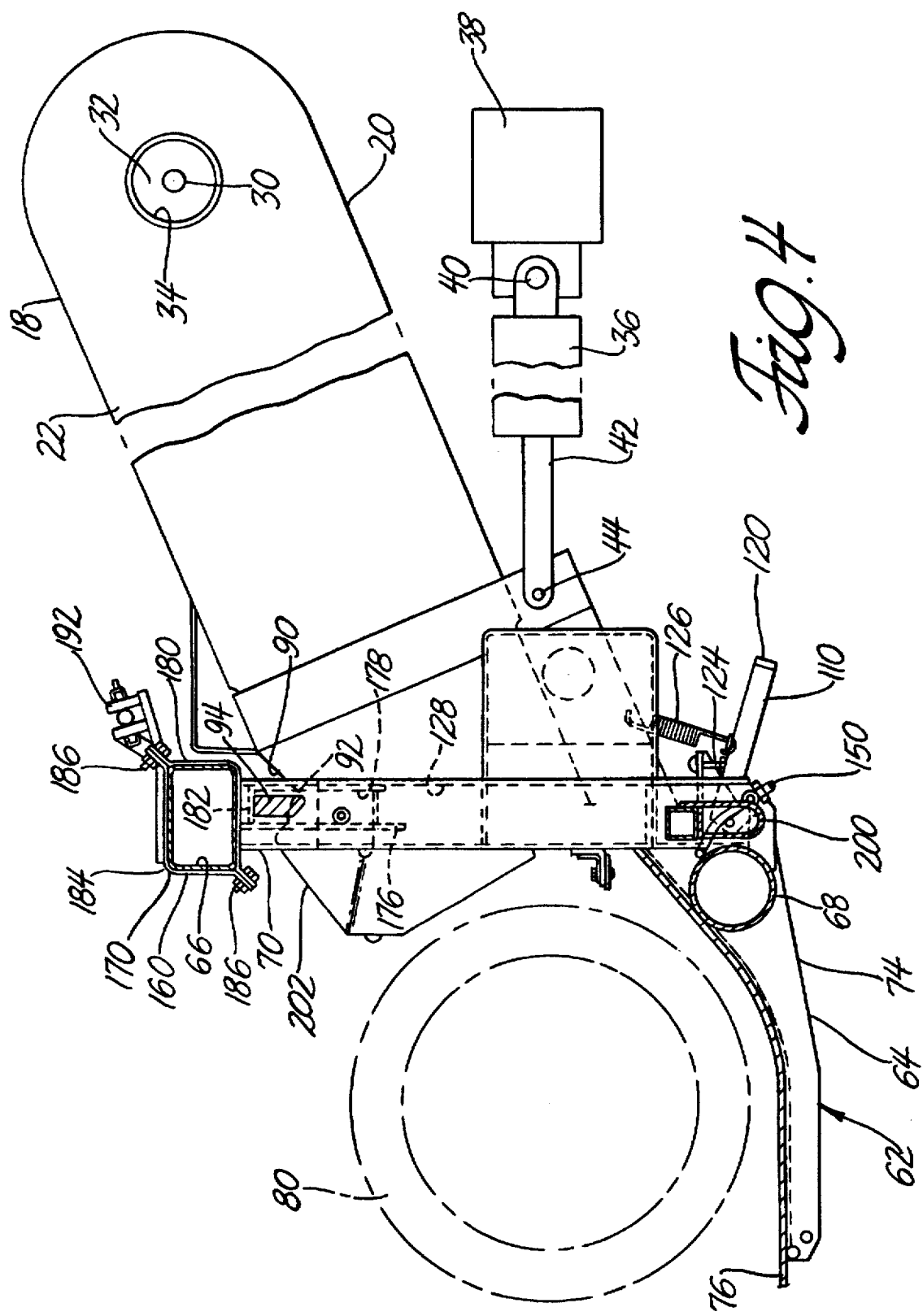
FIG. 4 is a sectional view of the header taken along line 4—4 in FIG. 3 and the elevator housing.
Figure 5:
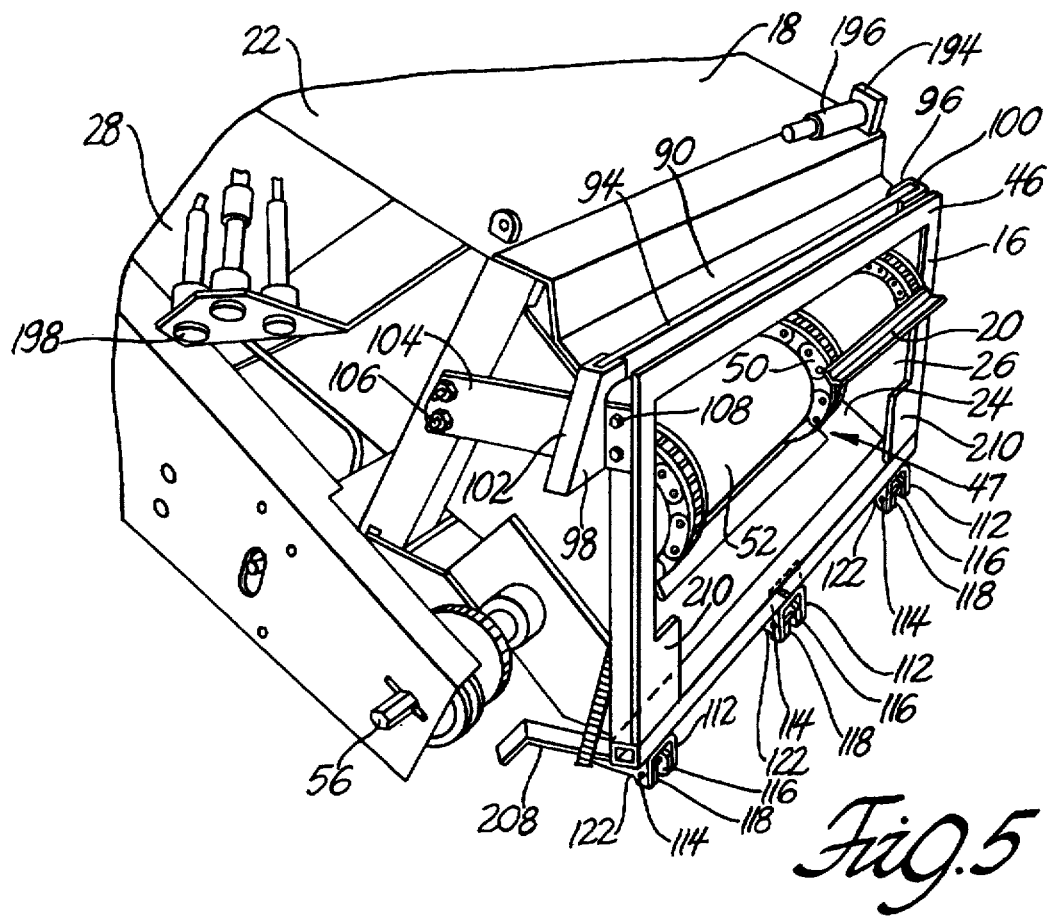
FIG. 5 is an enlarged perspective view of the elevator with parts broken away.
Figure 6:
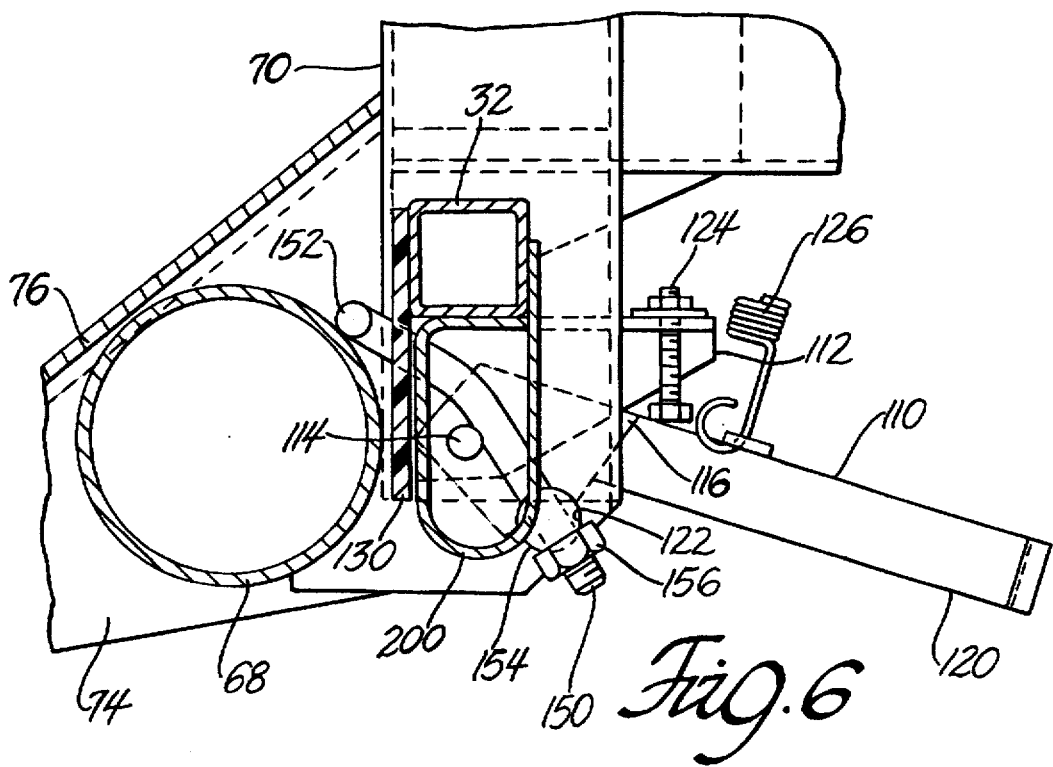
FIG. 6 is an enlarge sectional view of the center clamp that clamps the header to the bottom of the elevator housing.
Figure 7:
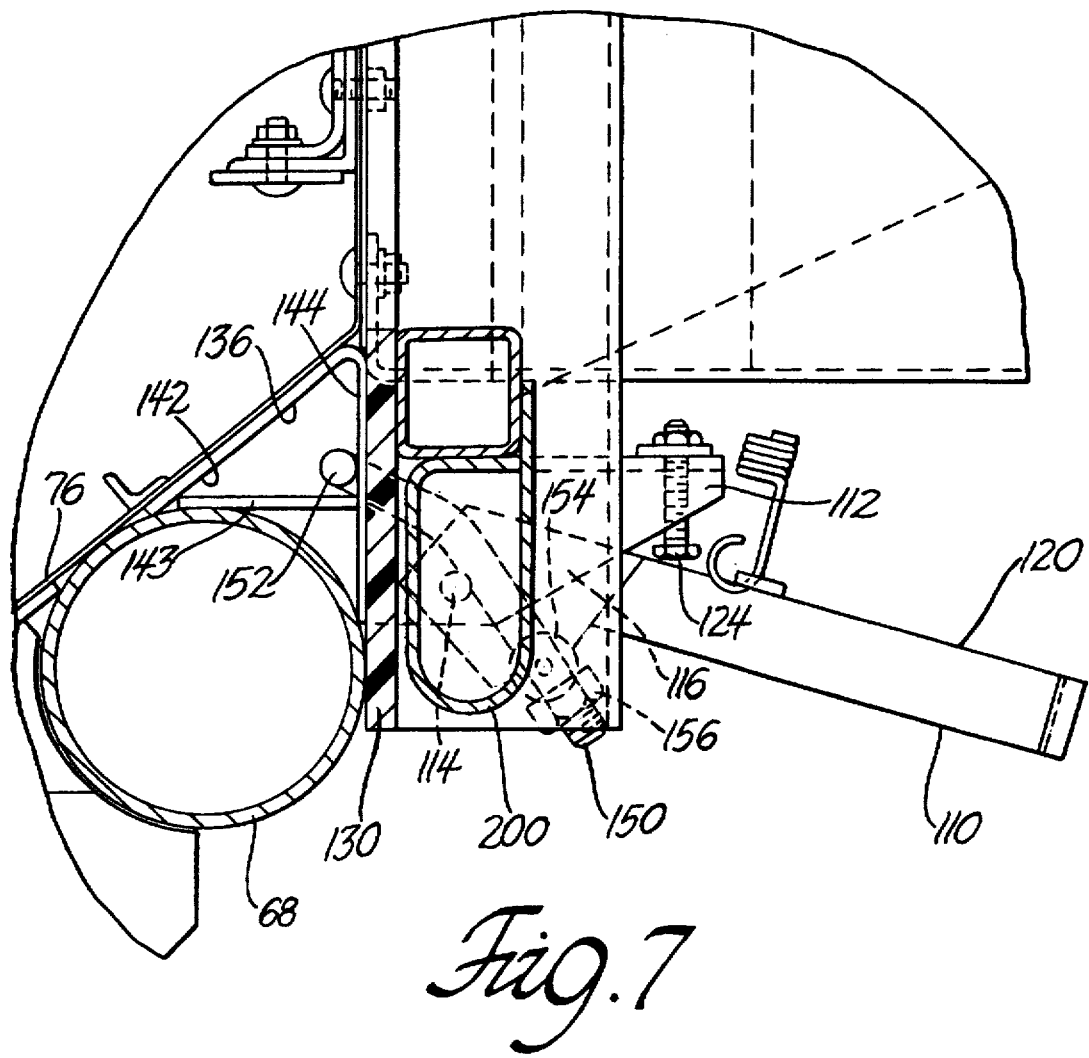
FIG. 7 is an enlarge sectional view similar to FIG. 6 showing the structure for connecting the clamp bar and bolts to the header frame.

A combine harvester 10, as shown in FIG. 1, has a separator housing 12 supported by driven front wheels 14 and steered rear wheels which are not shown. An operator's work station 16 is mounted on the left front portion of the separator housing 12. An elevator assembly 18 is pivotally attached to the separator housing 12 and extends forward from the separator housing between the front wheels 14.

The elevator assembly 18 includes an elevator housing 20 with a top wall 22, a floor 24, a left side wall 26, and a right side wall 28. A driven shaft 30 is journaled on the side walls 26 and 28 by bearings 32 and passes through apertures 34 in the side walls. One or more hydraulic cylinders 36 have their head ends pivotally attached to the axle assembly 38 by pins 40 as shown in FIG. 4. The axle assembly 38 is attached to the separator housing 12 and to the driven front wheels 14. The hydraulic cylinder 36 piston rods 42 have their free ends pivotally secured to the forward end of the elevator housing 20 below the floor 24 by a pin 44. Extension of the hydraulic cylinders 36 pivots the elevator housing 20 about the axis of the driven shaft 30 and raises the forward end of the housing. Retraction of the piston rods 42 pivots the elevator housing 20 about the axis of the driven shaft 30 and lowers the forward end of the housing 20. The forward end of the elevator housing 20 has a generally vertical flat surface 46 that surrounds the elevator inlet 47. The elevator assembly 18 includes a conveyor assembly 48. The conveyor assembly 48 as shown is a chain and slat type conveyor with three chains 50 trained around sprockets on the driven shaft 30 and a drum 52. Slats 54 are attached to the chains 50. During operation, the slats 54 drag crop material up the surface of the floor 24 of the elevator housing 20. The drum 52 is mounted in the elevator housing 20 and is permitted to move upward to allow crop material to move between the slats 54 and the floor 24 as it passes through the elevator inlet 47.

A shaft 56, driven by a chain 58 trained around a drive sprocket (not shown) on the shaft 30 and a driven sprocket 60, is journaled on the forward end of the elevator housing and passes under the floor 24. Torque is transmitted from the shaft 56 to the header 62 as explained below.

The header 62 as shown in FIGS. 1 and 4 is a grain header for harvesting crops such as wheat, barley, and soybeans. Grain headers can have rigid cutter bars or flexible cutter bars. Headers 62 could also be a corn head, a row crop head, or any other unit for severing crop material from the ground or for picking crop material up off the ground, gathering the crop material together and feeding the crop material into the elevator housing 20.

The header 62 has a frame 64 with an upper rectangular tube 66 and a lower torque tube 68. Vertical channels 70 are attached to the rectangular tube 66 and the torque tube 68. Panels 72 attached to the channel 70 and the rectangular tube 66 form a rear wall of the header 62. Ribs 74 are welded to the torque tube 68 and extend forward and downward from the torque tube 68. A plate 76 attached to the curved upper surface of the ribs 74 and the panels 72 forms an auger trough. End sheets 78 are attached to the ends of the rectangular tube 66 and the torque tube 68 of the frame 64 and to the plate 76. A cutter bar (not shown) is normally attached to the forward edge of the plate 76. An auger 80 is journaled on the end sheets 78 and extends the length of the auger trough. A reel 82 is journaled on reel arms 84 that are pivotally secured to the rectangular tube 66. A hydraulic cylinder 86 is pivotally connected to each reel arm and the adjacent end sheet 78 for adjusting the height of the reel 82 to accommodate changes in crop conditions. Crop dividers 88 are attached to the frame 64 for separating the crop that is to be harvested from that which is to remain standing during each pass through a field.

The top wall 22 of the elevator housing 20 has recessed surfaces 90 and 92, that extend at right angles to each other adjacent to the elevator housing inlet 47. These recesses surfaces 90 and 92 extend the entire width of the elevator housing 20.

A bar 94 is positioned in the v-shaped area where the recessed surfaces 90 and 92 are joined. Male ends 96 and 98 with arcuate surfaces 100 and 102 are integral with the bar 94. Bars 104 are integral with each end 96 and 98 and are secured to the respective left and right side walls 26 and 28 by bolts 106 and 108. The arcuate surfaces 100 and 102 are arcs about an axis located in the lateral center of the elevator housing 20, below the floor 24, and perpendicular to a plane including the flat surface 46 surrounding the elevator inlet 47.

A hook assembly 110 is pivotally attached to the U-shaped member 112, welded to the bottom of the floor 24 in the lateral center of the elevator housing 20, by two pins on 114. The hook assembly 110 includes two spaced apart blocks 116 and 118, a U-shaped handle 120 integral with the spaced apart blocks, and aligned arcuate surfaces 122 in the lower edge of the two spaced apart blocks. An adjustable stop bolt 124 limits pivotable movement of the hook assembly 110 in one direction. Tension spring 126 urges the hook assembly 110 toward the stop bolt 124.

The rear surface 128 of the header is in a flat vertical plane. The flat surface 46 of the elevator housing 20 makes sealing contact with the rear surface 128 of the header 62 when there is no lateral leveling. When there is lateral leveling, a high density plastic block 130 is attached to the header 62 below the discharge edge of the plate 76 that forms the auger trough. Vertical high density plastic blocks 132 and 134 are attached to the rear surface 128 of the header 162 at the sides of the header discharge opening 140. All three of the plastic blocks 130, 132, and 134 are ⅜ of an inch thick and serve as bearing surfaces during lateral leveling.

A metal plate 136 is bent into the shape of a triangle and welded to the torque tube 68 under the header discharge opening 140. The inclined side 142 of the triangle is in contact with the auger trough plate 76. The horizontal side 143 is a separate plate that is welded to the vertical side 144 of the triangle. The vertical side 144 has spaced vertical slots 146 and 148. T-shaped bolts 150 have their top transverse portions 152 inserted into one of the slots 146 or 148 and then rotated 90°. The portions 152 hold the T-shaped bolts 150 in the slots 146 and 148 and serve as fulcrums. Two of the T-shaped bolts 150 are inserted through bores through a round bar 154 and secured by lock-nuts 156.

A left female arcuate section 158 and a right female arcuate section 160 are clamped to the upper rectangular tube 66 to the left and right sides of the header discharge opening 140. The left arcuate section 158 includes a front plate 162 and a rear plate 164 welded to a lower clamp half 166. An arcuate plate 168 is welded in place between the front and rear plates 162 and 164. An upper clamp half 170 is secured to the lower clamp 166 by bolts 172 to secure the arcuate section 158 in place. A channel shaped member 174 is welded to the arcuate section 158 and attached to the channel member 70 by a bolt 175 to insure that the arcuate plate 168 remains fixed relative to the lateral center of the header 62. The right arcuate section 160 includes a front plate 176 and a rear plate 178 welded to a lower clamp 180. An arcuate plate 182 is welded in place between the front and rear plates 176 and 178. An upper clamp half 184 is secured to the lower half 180 by bolts 186 to secure the arcuate section 160 in place. A channel shaped member 188 is welded to the arcuate section 160 and attached to a channel member 70 by a bolt 190 to insure that the arcuate plate 182 remains fixed relative to the lateral center of the header 62. The front and rear plates 162, 164, 176 and 178 are positioned relative to the rear surface 128 of the header 62 to provide space for the plastic blocks 130, 132, and 134.

A first linear actuator bracket 192 is secured to the upper rectangular tube 66 of a header 62. A second linear actuator bracket 194 is secured to the top wall 22 of the elevator housing 20 near the left side wall 26. A double acting hydraulic cylinder 196 has its head end pivotally attached to the bracket 194 and its rod end pivotally attached to the first linear actuator bracket 192.

To connect the header 62 to an elevator assembly 18, the hydraulic cylinders 36 are retracted to lower the elevator inlet 47 and the combine harvester 10 is moved to position the upper part of the surface 46 adjacent to both plastic blocks 132 and 134. The cylinders 136 are then extended to lift the male end 96 into the female arcuate section 158 and the male end 98 into the female arcuate section 160. As the end 96 starts to move between the plates 162 and 164 and the end 98 starts to move between the plates 176 and 178, the rectangular tube 66 will be raised and the plastic block 130 will move toward the elevator housing 20 and the flat surface 46. Continued extension of the hydraulic cylinders 36 moves the male arcuate surface 100 into contact with the arcuate plate 168, moves the male arcuate surface 102 into contact with the arcuate plate 182, and moves the plastic block 130 into contact with the flat surface 46 below the floor 24 of the elevator housing 20. The cylinders 36 are then locked in and extended position and the operator moves under the elevator assembly 18, presses the U-shaped handle 20 downward and extends the tension spring 126. At the same time the round bar 154 is lifted thereby pivoting the T-shaped bolts 150 about their top transverse portions 152 and moving the arcuate surfaces 122 on the hook assembly 110 between the T-shaped bolts 150. The U-shaped handle 120 is then raised into contact with the stop bolt 124. This moves the center of the round bar 154 slightly past a line through the center of the transverse portion 152 of the bolt 150 and the center of the pins 114 thereby locking the hook assembly 110. When the hook assembly 110 is locked, the header 62 is locked to the elevator assembly 18.

To complete connection of the header 62 to the harvester 10, the hydraulic cylinder 196 is connected to actuator brackets 192 and 194, hydraulic connectors 198 are connected to hydraulic actuators 86 on the header 62 as required and drive shafts (not shown) on the header 62 are connected to the shaft 56 as required. Different headers 62 have different requirements for hydraulic and mechanical drives.

Hydraulic fluid can be supplied to the hydraulic cylinder 196 manually by the operator to laterally align the header with the surface of a field or an automated system can be employed. A low friction plastic material can be provided between the male end sections 96 and 98 and the female arcuate sections 158 and 160 as required to reduce friction or the surfaces can be lubricated.

The male end sections 96 and 98 can be modified to be carried on the header 62 and the female arcuate sections 158 and 160 can be modified to be carried on the elevator housing 20. The locations can be reversed as desired as long as a common effective pivot axis if provided in the lateral center of the elevator inlet 47 and below the floor 24 a short distance. The two T-shaped bolts 150 and the round bar 154 rotate sufficiently to accommodate header tilting where the effective pivot axis passes through the round bar 154 or close to the round bar. Skid members 200 are attached to the bottom of the elevator housing 20 to protect the hook assembly 110 when the cylinders 36 are retracted and the header 62 is not mounted on the harvester. A dust cover plate 202 covers the upper portion of the header discharge opening 140. This cover plate 202 reduces air and dust coming from the elevator inlet 47 that can under some conditions make it difficult for the operator to see the auger 80.

The header structural members 204 are attached to the torque tube 68 forward of the round bar 154 and do not therefore interfere with the T-shaped bolts 150 or the hook assembly 110. When the header 62 is used without lateral leveling, T-shaped bolts 150 are used in slots 206 at the side edges of the header discharge opening and additional hook assemblies 208 are required. The hook assemblies 208 are spaced from the common effective pivot axis and cannot be used with lateral leveling.

Plates 210 are added to the lower corners of the elevator inlet 47 to prevent loss of grain when the header 62 is pivoted to an extreme position for lateral leveling.

The invention has been described herein in considerable detail in order to provide those skilled in the art with the information needed to apply the novel principles and to construct and use such specialized components as are required. However, it is to be understood that the invention can be carried out by different structures and devices and that various modifications, both as to equipment details and operating procedures, can be accomplished without departing from the scope of the invention itself.

What is claimed is:

1. A combine harvester comprising a frame supported by wheels, a threshing and separating housing attached to the frame, an elevator assembly pivotally attached to the threshing and separating housing and including an elevator housing with a forward inlet opening, an elevator conveyor mounted in the elevator housing and at least one actuator attached to the frame and the elevator housing for pivoting the elevator housing relative to the threshing and separating housing to raise and lower the forward inlet opening; a combine header with a header frame, a header discharge opening and a header conveyor for conveying crop material through the discharge opening; and a quick coupler for attaching the combing header to the elevator housing including a first right arcuate section attached to the elevator housing, a second right arcuate section attached to the header frame and engagable with the first right arcuate section only, a first left arcuate section attached to the elevator housing, a second left arcuate section attached to the header frame and engagable with the first left arcuate section only and wherein at least one of the first and second right arcuate sections and at least one of the first and second left arcuate sections includes an arcuate member with a surface that is an arc about an axis that is laterally centered relative to the forward inlet of the elevator housing, below the forward inlet and generally horizontal; a clamp assembly for clamping the header to the elevator housing adjacent to said axis; and an actuator connected to the elevator housing and to the header frame that is operable to pivot the header frame about said axis relative to the elevator housing.

2. A combine harvester as set forth in claim 1 wherein the first right arcuate section and the first left arcuate section are movable downward and out of engagement with the second right arcuate section and the second left arcuate section, when the clamp assembly is in a released position, to disconnect the combine header from the elevator housing.

3. A combine harvester as set forth in claim 2 wherein the first right arcuate section and the first left arcuate section are movable upward and into engagement with the second right arcuate section and the second left arcuate section to connect the combine header to the elevator housing.

4. A combine harvester as set forth in claim 1 wherein the clamp assembly maintains engagement between the right first and second arcuate sections and between the left first and second arcuate sections when in a clamping position.

5. A combine harvester as set forth in claim 1 wherein the first right arcuate section and the second right arcuate sections have cooperating surfaces that limit forward movement of the second right arcuate section relative to the first right arcuate section; and wherein the first left arcuate section and the second left arcuate sections have cooperating surfaces that limit forward movement of the second left arcuate section relative to the first left arcuate section.

6. A combine harvester as set forth in claim 1 wherein the second right arcuate section includes a front vertical transverse member, a rear vertical transverse member and at least a portion of the first right arcuate section is between the front vertical transverse member and the rear vertical transverse member of the second right arcuate section; and the second left arcuate section includes a front vertical transverse member, a rear vertical transverse member and at least a portion of the first left arcuate section is between the front vertical transverse member and the rear vertical transverse member of the second left arcuate section.

7. A combine harvester as set forth in claim 1 wherein both the first right arcuate section and the second right arcuate section have arcuate members with surfaces that engage each other and support a portion of the combine header; and both the first left arcuate section and the second left arcuate section have arcuate members with surfaces that engage each other and support a portion of the combine header.

* * * * *